(12) United States Patent
Piponnier et al.

(10) Patent No.: US 9,363,484 B2
(45) Date of Patent: Jun. 7, 2016

(54) METHOD AND DEVICE FOR RANGE IMAGING

(71) Applicant: ONERA (Office National d'Etudes et de Recherches Aerospatiales), Chatillon (FR)

(72) Inventors: Martin Piponnier, Massy (FR); Jerome Primot, Chatillon (FR); Guillaume Druart, Palaiseau (FR); Nicolas Guerineau, Antony (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 790 days.

(21) Appl. No.: 13/972,327

(22) Filed: Aug. 21, 2013

(65) Prior Publication Data

US 2014/0055606 A1   Feb. 27, 2014

(30) Foreign Application Priority Data

Aug. 22, 2012 (FR) ...................... 12 02273

(51) Int. Cl.
 *H04N 7/18* (2006.01)
 *G01C 3/08* (2006.01)
 *G01B 11/14* (2006.01)

(52) U.S. Cl.
 CPC .................. *H04N 7/18* (2013.01); *G01B 11/14* (2013.01); *G01C 3/08* (2013.01)

(58) Field of Classification Search
 CPC ............. H04N 7/18; G01C 3/08; G01B 11/14
 USPC ....................................................... 348/140
 See application file for complete search history.

(56) References Cited

U.S. PATENT DOCUMENTS

| 3,832,029 A | 8/1974 | Bryngdahl |
| 2004/0037355 A1* | 2/2004 | Allie ................... H04N 19/70 375/240.02 |
| 2008/0137059 A1 | 6/2008 | Piestun et al. |

(Continued)

FOREIGN PATENT DOCUMENTS

| EP | 2309718 A1 | 4/2011 |
| WO | 9602009 | 1/1996 |

(Continued)

OTHER PUBLICATIONS

INPI (Institut National de la Propriete Industrielle), Preliminary Search Report issued Apr. 10, 2013, in corresponding French patent application No. 1202273, filed Aug. 22, 2012.
Montgomery, W. Duane, Self-Imaging Objects of Infinite Aperture, Journal of the Optical Society of America, Jun. 1967, pp. 772-778, vol. 57, No. 6, Arlington, Virginia.

(Continued)

*Primary Examiner* — Allen Wong
(74) *Attorney, Agent, or Firm* — Patzik, Frank & Samotny Ltd.

(57) ABSTRACT

A method for range imaging allows determining respective distances to multiple objects, based on a single image. The image is captured through a component having a transmittance function of which the Fourier transform is inscribed on a circle within a plane of spatial frequencies. A Fourier transform of the captured image is calculated in order to obtain a total spectrum for the image content. The distance to each object is then calculated based on several homothetic superimpositions of a reference spectrum with the total spectrum, so that said reference spectrum coincides with a portion of the total spectrum each time.

6 Claims, 4 Drawing Sheets

(56) References Cited

U.S. PATENT DOCUMENTS

| | | | | |
|---|---|---|---|---|
| 2009/0316240 A1* | 12/2009 | Hara | ............... | G11B 7/128 359/33 |
| 2010/0310130 A1* | 12/2010 | Beghuin | ............. | G01B 11/25 382/106 |
| 2012/0057023 A1* | 3/2012 | Yang | ............... | G01S 17/46 348/140 |

FOREIGN PATENT DOCUMENTS

| | | |
|---|---|---|
| WO | 2007106657 A2 | 9/2007 |
| WO | 2007115281 A1 | 10/2007 |
| WO | 2009019362 A1 | 2/2009 |
| WO | 2009106996 A2 | 9/2009 |
| WO | 2010080030 A2 | 7/2010 |

OTHER PUBLICATIONS

Park, Jae-Hyeung and Jeong, Kyeong-Min, Frequency Domain Depth Filtering of Integral Imaging, Optics Express, Sep. 12, 2011, vol. 19, No. 19, pp. 18729-18741.

Durnin, J., Exact Solutions for Nondiffracting Beams. I. The Scalar Theory, Journal of the Optical Society of America, Apr. 1987, vol. 4, No. 4, pp. 651-654.

Guerineau, N., et al., Generation of Achromatic and Propagation-Invariant Spot Arrays by Use of Continuously Self-Imaging Gratings, Optics Letters, Apr. 1, 2001, vol. 26, No. 7, pp. 411-413.

Piponnier, Martin, Etude et developpment de tableaux non diffractants pour la conception de systemes imageurs avances, Journees Scientifiques de I'Ecole doctorale Ondes et Matieres (EDOM), Mar. 2011.

* cited by examiner

METHOD AND DEVICE FOR RANGE IMAGING

RELATED APPLICATIONS

This invention claims priority to French patent application No. FR 12/02273, filed Aug. 22, 2012, the entirety of which is hereby incorporated by reference.

FIELD OF THE INVENTION

The invention relates to a method and device for range imaging.

BACKGROUND OF THE INVENTION

There are many applications which require not only detecting objects within a field of view, but also determining the distance to each detected object. Such applications include power line detection to ensure the safety of moving helicopters, runway light detection to assist jets during landing, etc. Outside of stereographic imaging methods, the usual optical imaging methods do not allow rapid and precise determination of the distance to objects captured in an image.

Stereographic imaging requires capturing at least two images of the same object from different angles of view. This requirement leads to the following difficulties:
- at least two image capture devices must be installed in parallel, with precisely defined positions relative to each other;
- the images must be captured at the same moment if the captured object is moving; and
- image correlation software is required for comparing the positions of the same object in the images captured separately by the two devices.

Planar optical components are known, in which the transmittances vary as a function of two coordinates inside the plane of each component, and have two-dimensional Fourier transforms which consist of peaks located on a circle of a determined radius. Such components are said to be continuously self-imaging and are described in the article entitled "Exact solutions for nondiffracting beams. I. The scalar theory," J. Durnin, Journal of the Optical Society of America A, Vol. 4, pp. 651-654, 1987, and in the article which defines continuously self-imaging gratings and which is entitled "Generation of achromatic and propagation-invariant spot array by use of continuously self-imaging gratings," N. Guérineau et al., Optics Letter, Vol. 26, pp. 411-413, 2001.

In addition, the presentation by Piponnier et al. which is entitled "Analysis and development of non-diffracting arrays for the design of advanced imaging systems," Journées scientifiques de l'Ecole Doctorale Ondes & Matiéres (EDOM), 7-8 Mar. 2011, proposes associating such a continuously self-imaging component with an image sensor for applications involving detection, identification, or accurate location determination for simple objects.

An object of the present invention is therefore to propose a new method of range imaging which does not have the disadvantages cited above for the stereographic methods.

In particular, one object of the invention is to determine the respective distances to multiple objects contained within a field of view, based on a single image captured.

Another object of the invention is to determine simply the distances to the objects without requiring significant computational capacity.

SUMMARY OF THE INVENTION

To this end, the invention proposes a method which comprises the following steps:

/1/ obtaining a planar optical component having a transmittance t which varies as a function of two coordinates in a plane of the component, and which has a two-dimensional Fourier transform T consisting of peaks located on a base circle of radius $\rho_\infty$;

/2/ arranging the component perpendicular to an optical axis Z which is oriented towards the field of view;

/3/ arranging an image sensor in a plane perpendicular to the axis Z, at a distance $d_f$ from the component and on the side of the component which is opposite the field of view;

/4/ using the sensor to capture an image formed by light originating from the objects through the component; and /5/ calculating a Fourier transform of the captured image, in order to obtain a spectrum $S_{tot}$ of spatial frequencies corresponding to peaks of the Fourier transform of the captured image, this spectrum for the captured image comprising multiple concentric components which are each inscribed in a respective circle.

According to the properties of the transmittance t of the optical component which are indicated in step /1/, this component is continuously self-imaging.

The method of the invention is characterized in that, in step /1/, the Fourier transform T of the transmittance t of the component consists of a finite number N of peaks which are distributed on the base circle having radius $\rho_\infty$. In addition, the method comprises the following additional steps, which are performed after step /5/:

/6/ providing a reference spectrum $S_{ref}$ which corresponds to peaks of a Fourier transform of a reference image as produced by a point light source located at infinite distance away on axis Z, through the component onto the sensor, this reference spectrum $S_{ref}$ consisting of reference spatial frequencies and being inscribed in the reference circle of radius $2\rho_\infty$, equal to twice the radius of the base circle;

/7/ in a common reference system, concentrically superimposing the spectrum of spatial frequencies of the captured image $S_{tot}$ and the reference spectrum $S_{ref}$;

/8/ digitally transforming, by a homothety centered in the common reference system, the reference spectrum $S_{ref}$ inscribed in the reference circle of radius $2\rho_\infty$ into a transformed reference spectrum $S_i$ which is inscribed in a circle of variable radius $2\rho_\infty$, by varying a homothety ratio $H_i$ which is equal to $2\rho_i/2\rho_\infty$;

/9/ storing the homothety ratio $H_i$, when all the peaks of the transformed reference spectrum $S_i$ are superimposed with peaks of the spectrum of the captured image $S_{tot}$, the transformed reference spectrum $S_i$ then coinciding with one of the components of the spectrum of the captured image $S_{tot}$; and /10/ calculating the distance to one of the objects in the field of view, using the formula $d_i = d_f/(H_i - 1)$.

The sequence of steps /8/ to /10/ is then repeated until it is no longer possible to perform step /9/ with a new value for the homothety ratio $H_i$ that is different from the previously stored values. Each distance $d_i$ obtained during one of the executions of step /10/ then corresponds to one of the objects contained in the field of view.

Thus, in the method of the invention, the image capture step /4/ is only executed once for determining the respective distances of multiple objects. The distances which are determined relate to one same moment of time, the moment when the image is captured, with no need to take into account a possible movement of the imaging device. The invention therefore allows a simple calculation of the distances to multiple objects, as these distances are at the same moment of time.

Because of the linearity of the Fourier transform, the Fourier transform of the image of multiple objects which is calculated in step /5/ is identical to the sum of the respective Fourier transforms which would each be produced by only one of the objects.

Due to the fact that the Fourier transform T of the transmittance t of the component consists of a finite number N of peaks which are distributed over the base circle, the spatial frequency spectrum which is produced by an object present in the field of view has gaps. These gaps allow distinguishing the respective contributions of the objects in the spectrum $S_{tot}$ of the captured image, in step /9/, and then individually calculating the distance to each object in step /10/.

It is possible to supplement the method by counting the objects present in the field of view, distinguished from each other by their distances. To this purpose, the iterations of the sequence of steps /8/ to /10/ which produce different values for the homothety ratio $H_i$ are counted, and the number n of objects contained in the field of view is determined as being equal to the number of these iterations.

In preferred implementations of the invention, the component may be a periodic continuously self-imaging grating. In this case, the peaks of the Fourier transform T of the transmittance t of the component are located simultaneously on a periodic grating and on the reference circle of radius $\rho_\infty$. This facilitates the search for coincidence performed in step /9/, between the spatial frequencies of the reference spectrum $S_{ref}$ and at least a portion of the spectrum $S_{tot}$ of the image which has been captured. It is then easier to determine with precision the respective distances to multiple objects which may be close to each other within the field of view.

The invention also proposes a range imaging device which comprises:
- the planar optical component, possibly of the periodic continuously self-imaging grating type;
- the image sensor, which is arranged parallel to and at a distance $d_f$ from the component, on the side of the component that is opposite the field of view, with the optical axis Z perpendicular to the component and to the sensor;
- a storage unit, which is adapted for storing an image captured by the sensor, and for storing the reference spectrum $S_{ref}$; and
- a computation unit, which is adapted for executing steps /7/ to /10/ of a method as described above, repeating the sequence of steps /8/ to /10/ as long as a new value for the homothety ratio $H_i$ is obtained in step /9/.

In the device of the invention, the component is adapted so that the Fourier transform T of its transmittance t consists of a number N of peaks distributed on the base circle of radius $\rho_\infty$, the number N being finite or limited.

It is possible for the component to be a phase grating. It can then be designed and implemented more easily using manufacturing methods which are available and well understood.

BRIEF DESCRIPTION OF THE DRAWINGS

Other features and advantages of the invention will be apparent from the following description of some non-limiting examples, with reference to the attached drawings, in which.

For clarity, the dimensions of the elements represented in these figures do not correspond to actual dimensions nor to actual ratios between dimensions. In addition, when same references are used in different figures they indicate identical elements or elements with identical functions.

Figure 1:
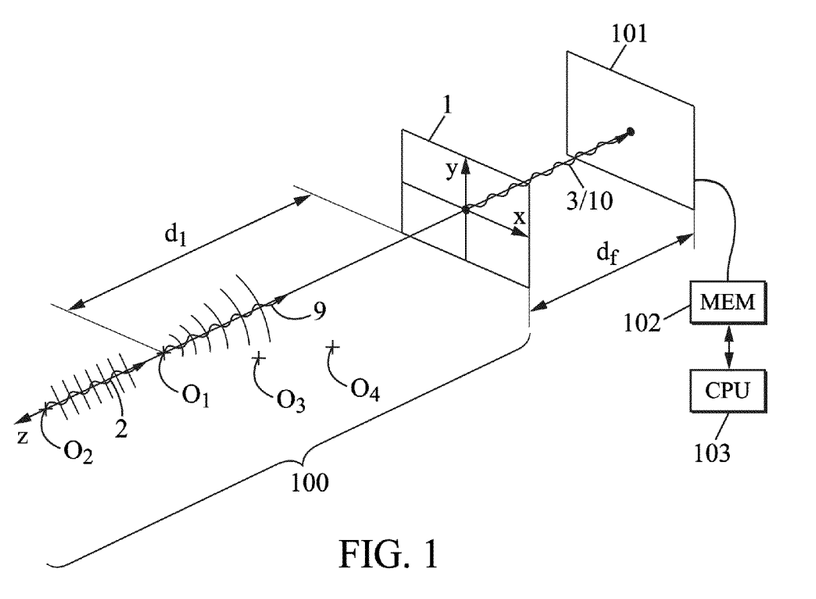
FIG. 1 schematically represents a range imaging device according to the invention.

In FIG. 1, the references indicated have the following significance:
1 planar optical component,
101 image sensor,
102 unit for storing an image captured by the sensor 101, denoted MEM,
103 computation unit denoted CPU, which is adapted for processing image data stored in the unit 102,
Z optical axis of the imaging device, perpendicular to the component 1 and to the sensor 2,
$d_f$ distance between the component 1 and the sensor 2, measured parallel to axis Z,
100 field of view extending around axis Z,
$O_1$-$O_4$ objects contained within the field of view 100, producing or reflecting light to the sensor 101 through the component 1,
$O_1$ light-emitting object located on axis Z within the field of view 100, at a finite distance from the component 1,
$O_2$ light-emitting object located on axis Z within the field of view 100, at a distance from the component 1 which can be considered as infinite,
2 planar wave originating from object $O_2$ and reaching the sensor 101 through the component 1,
3 resultant wave produced by the component 1 from the planar wave 2,
$d_1$ distance between object $O_1$ and the component 1, measured parallel to axis Z, and
9 spherical wave originating from object $O_1$ and reaching the sensor 101 through the component 1.

DETAILED DESCRIPTION OF THE INVENTION

The electromagnetic radiation originating from each of the objects $O_1$-$O_4$ may be monochromatic or may consist of any number of radiations at respective distinct wavelengths. It may be within any of the wavelength ranges used for optically detecting or observing objects, particularly far infrared, mid infrared, near infrared, visible, etc. The sensor 101 is then selected accordingly, as a function of its frequency range of sensitivity. In addition, the radiation from the objects $O_1$-$O_4$ may be spatially coherent or incoherent.

The component 1 is translucent within an opening which may be rectangular in a plane perpendicular to the axis Z, and denoted by two Cartesian axes x and y inside this plane. The sensor 101 may consist of an array of photosensitive elements which are aligned parallel to the axes x and y.

Inside the opening of the component 1, the transmission from the component, denoted t, is a function of the two coordinates x and y: t(x, y). The Fourier transform of the transmittance t(x, y) relative to the two coordinates x and y is denoted $T(\sigma_x, \sigma_y)$. Thus, $\sigma_x$ is the spatial frequency corresponding to the x coordinate, and $\sigma_y$ is the spatial frequency corresponding to the y coordinate. For the invention, the component 1 is selected such that the function $T(\sigma_x, \sigma_y)$ consists of a finite number N of peaks which are all located on a given circle in the plane of spatial frequencies identified by the axes of $\sigma_x$ and $\sigma_y$. This circle is called base circle and is centered on the point of origin of the two axes of spatial frequencies $\sigma_x$ and $\sigma_y$, and its radius is denoted $\rho_\infty$.

In practice, the function $T(\sigma_x, \sigma_y)$ is first selected, then the transmittance function t(x, y) is calculated by reverse Fourier transform. The component 1 can then be manufactured by locally adjusting its transmittance at each point inside its opening. Such an adjustment may be performed by digitally modulating an amount of irradiation which is successively focused at each point on a grid in the opening of the component 1, when a film of appropriate photosensitive material is placed in this opening. A person skilled in the art will understand that the peaks of the function $T(\sigma_x, \sigma_y)$ are not infinitely thin, but have a width which depends on the dimensions of the opening in the component 1.

Due to the fact that the function $T(\sigma_x, \sigma_y)$ consists of peaks which are located on the base circle with radius $\rho_\infty$ and center $\sigma_x=\sigma_y=0$, the radiation 3 which results from the plane wave 2 after passing through the component 1 has an intensity distribution which is translation-invariant parallel to axis Z. This intensity is proportional to the square of the transmittance modulus t(x, y): $|t(x, y)|^2$, in any plane perpendicular to axis Z between the component 1 and the detector 101.

Figure 2:
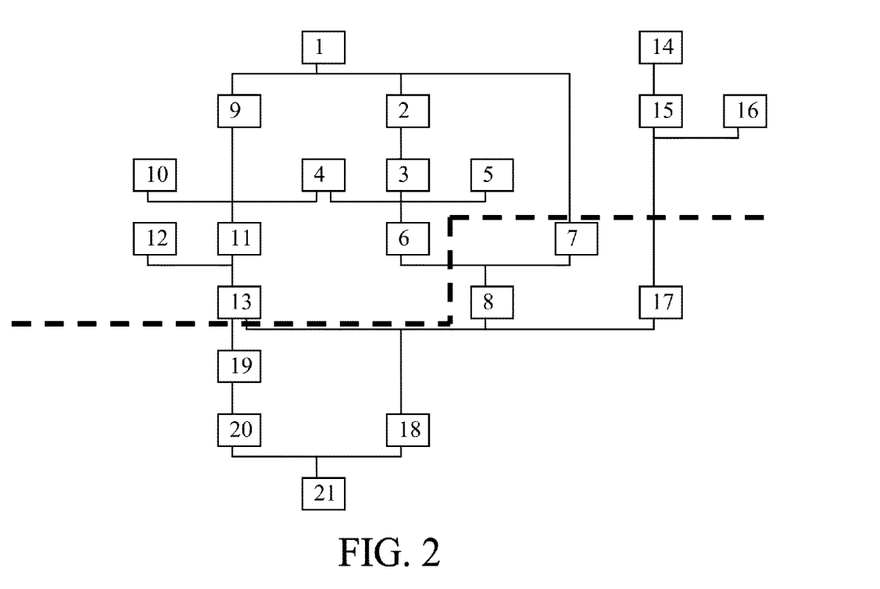
FIG. 2 is a chart of the properties and the steps involved during a use of the device of FIG. 1.

This intensity distribution is the one produced by the light-emitting object $O_2$ in a plane parallel to the component 1. It is denoted 4 in the chart in FIG. 2, and is called reference image. It is formed on the sensor 101. The decomposition 5 of this reference image by Fourier transformation produces a series of N' peaks which are respectively located at value pairs for the spatial frequencies $\sigma_x$ and $\sigma_y$, N' being a non-zero whole number. The set of these value pairs for the spatial frequencies $\sigma_x$ and $\sigma_y$ then constitutes a reference pattern, which is called the reference spectrum and is denoted $S_{ref}$. Through the properties of Fourier transformation, the reference spectrum $S_{ref}$ is the autocorrelation of the Fourier transform $T(\sigma_x, \sigma_y)$ of the transmittance t(x, y) (property 6 of FIG. 2). It is inscribed in a circle of radius $f_c=2\rho_\infty$ and of center $\sigma_x=\sigma_y=0$, referred to as reference circle. In the present invention, the circle in which a spectrum is inscribed, or the circle circumscribing the spectrum, is the smallest circle which contains all peaks of this spectrum, with certain peaks possibly being located on the circle itself.

Figure 3A:
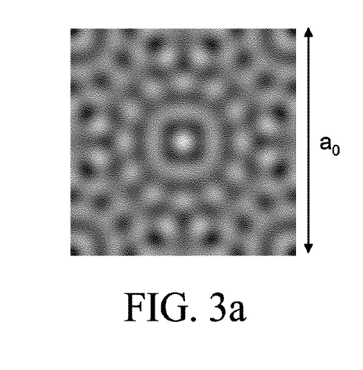
FIGS. 3a to 3c show three examples of transmittance which can alternatively be used for the device of FIG. 1, and FIGS. 4a to 4c show the associated Fourier transforms.
Figure 4A:
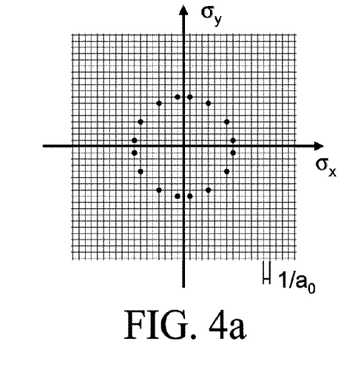

Preferably, the component 1 may additionally be a periodic grating. Its transmittance function t(x, y) then consists of a base two-dimensional pattern which is repeated in order to fill the opening of the component 1. This base pattern may be of any shape that can be used to tile the opening of the component 1. In this case of periodic grating, the peaks of the Fourier transform $T(\sigma_x, \sigma_y)$ are additionally located on at least some of the nodes of a periodic grid in the plane of the spatial frequencies $\sigma_x$ and $\sigma_y$. FIG. 3a shows a first example of base pattern, which is square in shape with sides of length $a_o$. The horizontal and vertical sides of the base pattern may respectively be parallel to the axes x and y. FIG. 4a shows the Fourier transform $T(\sigma_x, \sigma_y)$ which is associated with the transmittance t(x, y) of FIG. 3a. The horizontal and vertical directions of FIG. 4a are those of the axes of the spatial frequencies $\sigma_x$ and $\sigma_y$. This Fourier transform is composed of 16 peaks associated with distinct orders of diffraction, which are located both on the nodes of a grid of spacing $1/a_0$ due to the periodic grating nature of the component 1, and on the base circle due to the continuously self-imaging nature of the component 1. In this example, the radius $\rho_\infty$ of the base circle is equal to $65^{1/2}/a_0$.

Figure 3B:
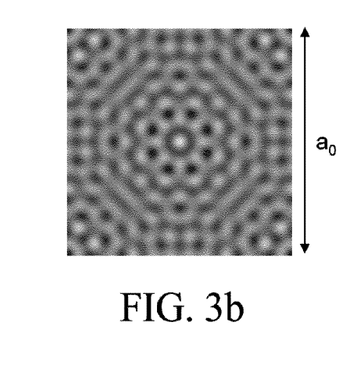
Figure 4B:
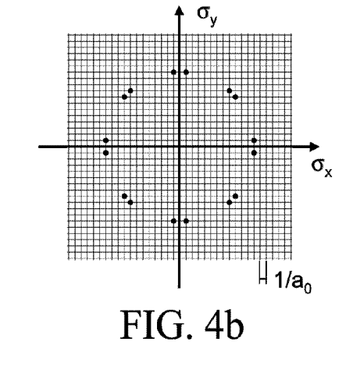

FIGS. 3b and 4b respectively correspond to FIGS. 3a and 4a, for another square base pattern of the transmittance t(x, y). The Fourier transform $T(\sigma_x, \sigma_y)$ is again composed of 16 orders of diffraction for which the peaks are located at some nodes in a grid of spacing $1/a_0$. But these diffraction peaks are now located on a base circle which has the radius $\rho_\infty=145^{1/2}/a_0$, with an angular distribution in the plane of spatial frequencies $\sigma_x$ and $\sigma_y$ which is different from FIG. 4a.

Figure 3C:
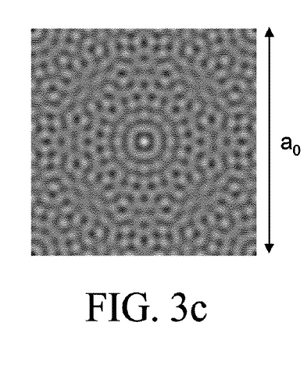
Figure 4C:
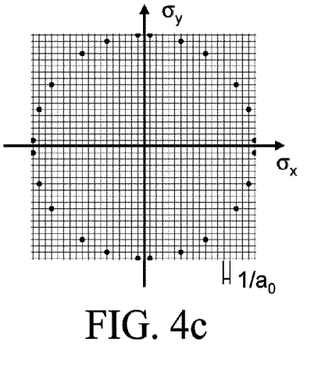

FIGS. 3c and 4c also respectively correspond to FIGS. 3a and 4a, for yet another square base pattern of the transmittance t(x, y). The Fourier transform $T(\sigma_x, \sigma_y)$ is then composed of 24 diffraction peaks which are again located at some nodes in a grid of spacing $1/a_0$, but while simultaneously belonging to the base circle having the radius $\rho_\infty=325^{1/2}/a_0$.

One should keep in mind that although the Fourier transform $T(\sigma_x, \sigma_y)$ is composed of a finite number of orders of diffraction which are angularly separated in the case where the component 1 is constituted by a periodic grating, these orders combine spatially so that the light intensity distribution between the component 1 and the sensor 101 remains translation-invariant parallel to axis Z.

FIG. 5a again corresponds to FIG. 3a in another example of a base pattern of the transmittance t(x, y), when the component 1 is again a periodic grating with square tiling. FIG. 5b shows the positions of the peaks of the Fourier transform (FT) of the function which consists of the square of the transmittance modulus t(x, y): $FT|t(x, y)|^2(\sigma_x, \sigma_y)$ in the plane of spatial frequencies $\sigma_x$ (horizontal direction in FIG. 5b) and $\sigma_y$ (vertical direction in FIG. 5b): this is the reference spectrum for the component 1 where the transmittance t(x, y) has the pattern of FIG. 5a.

Independently, for the spherical incident wave 9 originating from the object $O_1$ located at the finite distance $d_1$ on axis Z, the intensity 10 (FIG. 2) which is propagated downstream from the component 1 is continuously homothetic to itself along axis Z, between the component 1 and the sensor 101. The intensity distribution which is thus produced in the plane of the sensor 101, meaning at the fixed distance $d_f$ downstream from the component 1 in a plane which is perpendicular to axis Z, is called a dilated image. This dilated image results from a homothety 11 which is applied to the reference image with a homothety ratio $H_1$ of $1+d_f/d_1$. The decomposition 12 of the dilated image into spatial frequencies, by Fourier transformation for the two coordinates x and y, produces a set of peaks which are located at a set of value pairs for the spatial frequencies $\sigma_x$ and $\sigma_y$, called dilated spectrum $S_{dil}$. This dilated spectrum $S_{dil}$ consists of N' peaks which have the same relative distribution in the plane of spatial frequencies as the N' peaks of the reference spectrum $S_{ref}$. The peaks of the dilated spectrum are located within a circle of radius $f_c'=2\rho_\infty/H$ (property 13 in FIG. 2).

When n distinct objects 14, n being an integer greater than one, for example the three objects $O_1$, $O_3$ and $O_4$, simultaneously produce light through the component 1 to the sensor 101, the total image $I_{tot}$ in the plane of the sensor is the sum 15 of the images $I_i$ which are respectively produced by all the objects i, i being equal to 1, 3 or 4 in the example represented. However, the Fourier transformation is a linear mathematical operation 16. As a result, the total spectrum $S_{tot}$ of the entire image $I_{tot}$ produced by the n objects together is the sum 17 of the spectra $S_i$ which would be respectively and separately produced by all the objects i. In other words, each spectrum $S_i$ is a component of the total spectrum $S_{tot}$.

Given that:

7: the Fourier transform $T(\sigma_x, \sigma_y)$ of the transmittance $t(x, y)$ consists of a finite number N of peaks which are distributed on the base circle of radius $\rho_\infty$;

8: the reference spectrum $S_{ref}$ consists of a set of N' peaks inscribed within the reference circle of radius $2\rho_\infty$; and 18: the spectra $S_i$ are discrete and inscribed in respective circles of different radii $f_{ci}'$, the spectra $S_i$ which are produced separately by all the objects i located on axis Z are separate within the plane of spatial frequencies $\sigma_x$ and $\sigma_y$.

The invention therefore proposes an algorithm 19 for detecting the n objects and determining their respective distances $d_i$. Based on the measurement of the radius $f_{ci}'$ which is individually associated with each object i in the plane of the spatial frequencies $\sigma_x$ and $\sigma_y$, the radius $f_c$ being known a priori, the homothety ratio $H_i$ is equal to the quotient $f_c/f_{ci}'$ for the object i concerned. Lastly (step 20 in FIG. 2), the distance to each object i is obtained individually by the relation $d_i = d_f/(H_i - 1)$.

Thus (step 21 of FIG. 2), the method of the invention allows detecting multiple objects which are located at different distances away within the field of view, from a single image capture. It then allows clearly separating, in the plane of the spatial frequencies, the respective contributions to the total image which are produced by the different objects, then calculating the distance to each object. The technical problem of providing a range imaging device without any moving element is therefore solved.

Figure 5A:
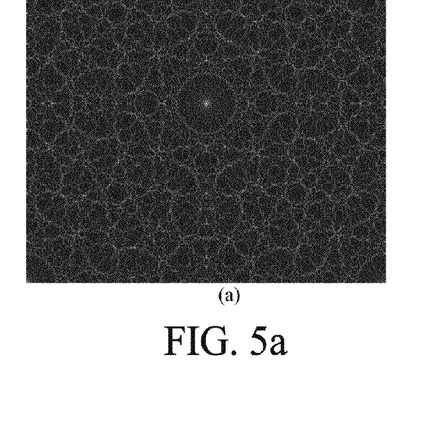
FIG. 5a shows yet another example of transmittance which can be used for the device of FIG. 1.
Figure 5B:
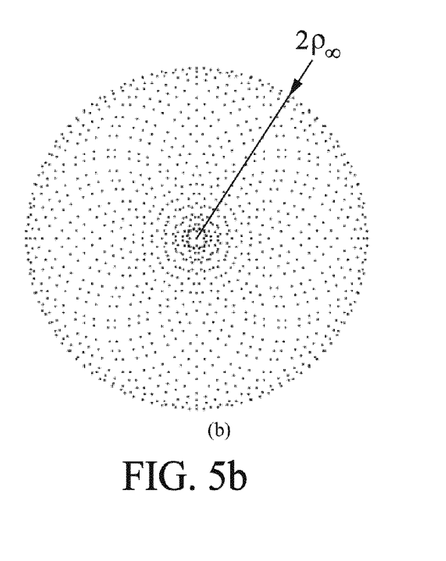
FIG. 5b shows the associated reference spectrum.
Figure 6A:
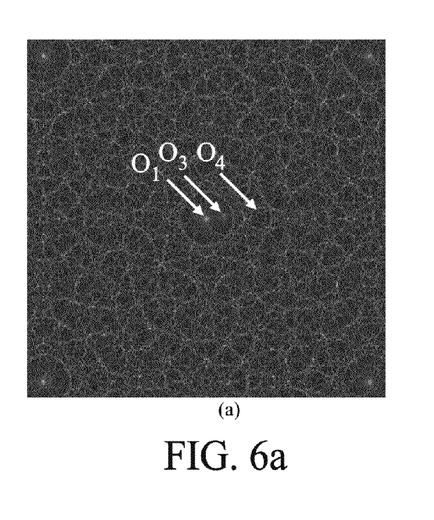
FIG. 6a shows an image captured by the device of FIG. 1 when the transmittance of FIGS. 5a and 5b is used.
Figure 6B:
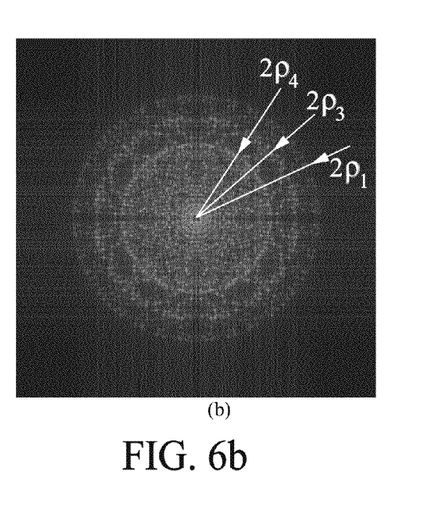
FIG. 6b shows the associated full spectrum.

FIG. 6a shows a total image $I_{tot}$ which has been captured by the sensor 101 for three objects simultaneously located near axis Z, when the component 1 corresponds to FIGS. 5a and 5b. The three objects are, for example, $O_1$, $O_3$ and $O_4$ of FIG. 1. The white arrows indicate the positions of these three objects, where $O_1$ is on axis Z and $O_3$ and $O_4$ are offset relative to axis Z (zero offset is at the center of the figure). FIG. 6b shows the Fourier transform of the total image $I_{tot}$ of FIG. 6a, with respect to both coordinates x and y. It consists of three sets of peaks which are inscribed in circles of distinct radii $2\rho_i$, with the index i equal to 1, 3 or 4 identifying the circles respectively corresponding to the three objects $O_1$, $O_3$ and $O_4$. The greater the radius $2\rho_i$ of the circle in the plane of the spatial frequencies $\sigma_x$ and $\sigma_y$, the further away the corresponding object i is from the component 1.

Figure 7:
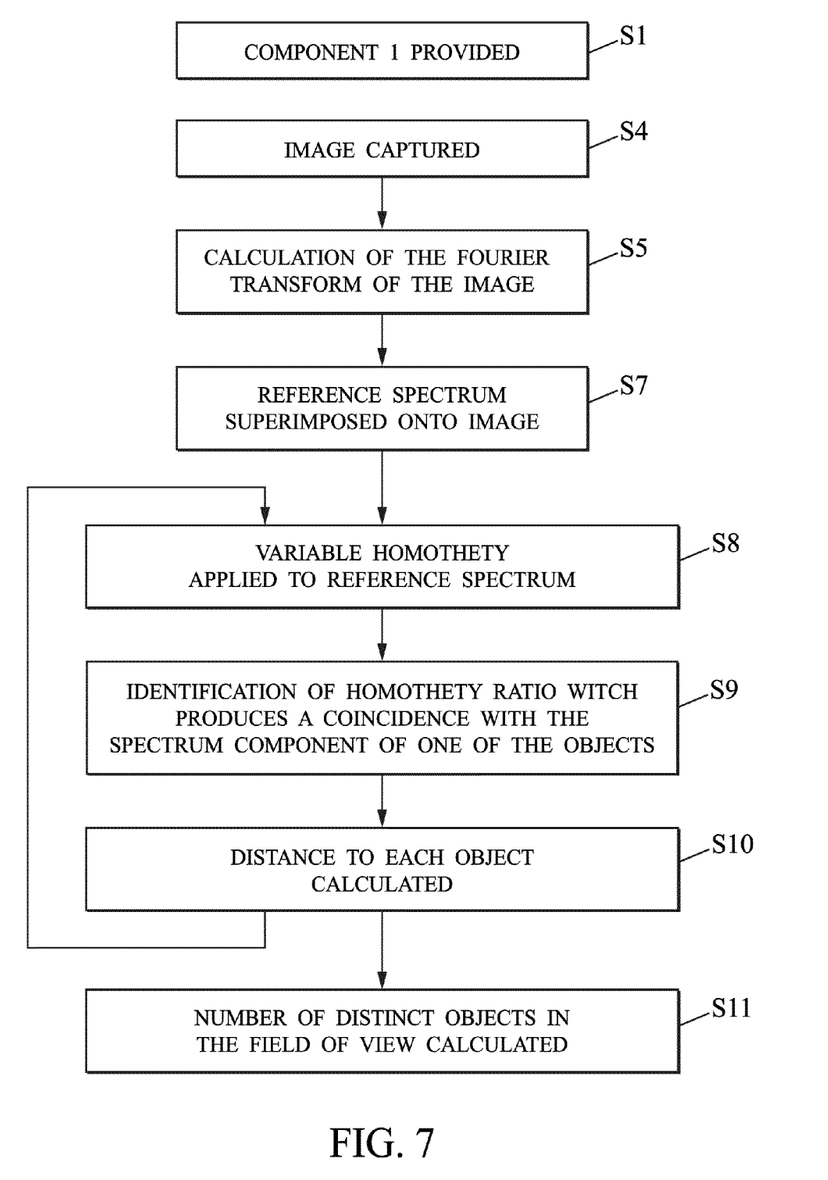
FIG. 7 is a diagram summarizing the steps executed during a use of the device of FIG. 1.

With reference to the diagram of FIG. 7 and to FIGS. 5a, 5b, 6a and 6b, the use of the range imaging device of FIG. 1 comprises the following steps:

Step S1: inserting the component 1 which has the transmittance function $t(x, y)$ of FIG. 5a, into the device of FIG. 1;

Step S4: capturing the image of FIG. 6a, referred to as the total image $I_{tot}$;

Step S5: calculating the Fourier transform of the image of FIG. 6a, producing the total spectrum $S_{tot}$ of FIG. 6b;

Step S7: superimposing the reference spectrum $S_{ref}$ of FIG. 5b onto the total spectrum $S_{tot}$ of FIG. 6b, using the same central point of coordinates $\sigma_x = 0$ and $\sigma_y = 0$ for the two spectra;

Step S8: in the superposition, homothetically varying the reference spectrum $S_{ref}$ within the plane of the spatial frequencies $\sigma_x$ and $\sigma_y$, so that the radius of circumscribed circle becomes equal to the radius $2\rho_i$ of the circumscribed circle for one of the component spectra $S_i$ of the total spectrum $S_{tot}$;

Step S9: identifying the homothety ratio $H_i$ for which the transformation of the initial radius $2\rho_\infty$ of the circumscribed circle for the reference spectrum $S_{ref}$ becomes equal to the radius $2\rho_i$ of the circumscribed circle for spectrum $S_i$; then Step S10: based on the value of the homothety ratio $H_i$, calculating the distance $d_i$ to the object i which produced the spectrum $S_i$.

Steps S8 to S10 are repeated for each spectrum $S_i$ which can be distinguished with a distinct radius within the total spectrum $S_{tot}$.

Lastly, in the next step S11 which is optional, the number of repetitions of the sequence of steps S8 to S10 corresponds to the number of distinct isolated objects which are present in the field of view 100 and which are sending light through the component 1 to the sensor 101.

An object which is contained in the field of view 100 can extend for a non-zero length parallel to the optical axis Z. In this case, the sequence of steps S8 to S10 can be repeated for any values of the homothety ratio H which are within a continuous interval between two limit values. The length of this interval provides the length of the object along axis Z by means of the formula $d = d_f/(H-1)$, where d is the distance to a current point of the object relative to the component 1.

The invention claimed is:

1. A method for range imaging, for determining respective distances to multiple objects contained within a field of view, based on a single captured image, the method comprising the following steps:

/1/ obtaining a planar optical component having a transmittance t, said transmittance varying as a function of two coordinates (x, y) in a plane of the component, and having a two-dimensional Fourier transform T consisting of a finite number N of peaks located on a base circle of a radius $\rho_\infty$;

/2/ arranging the component perpendicularly to an optical axis Z oriented towards the field of view;

/3/ arranging an image sensor in a plane perpendicular to the axis Z, at a distance $d_f$ from the component and on the side of said component which is opposite the field of view;

/4/ using the sensor to capture an image formed by light originating from the objects through the component; and /5/ calculating a Fourier transform of the captured image, in order to obtain a spectrum $S_{tot}$ of spatial frequencies corresponding to peaks of the Fourier transform of the captured image, said spectrum for the captured image comprising multiple concentric components which are each inscribed in a respective circle;

/6/ providing a reference spectrum $S_{ref}$ corresponding to peaks of a Fourier transform of a reference image as produced by a point light source located at infinite distance away on axis Z, through the component onto the sensor, said reference spectrum $S_{ref}$ consisting of reference spatial frequencies and being inscribed in a reference circle of a radius $2\rho_\infty$, equal to twice the radius of the base circle;

/7/ in a common reference system, concentrically superimposing the spectrum of spatial frequencies of the captured image $S_{tot}$ and the reference spectrum $S_{ref}$;

/8/ digitally transforming, by a homothety centered in the common reference system, the reference spectrum $S_{ref}$ inscribed in the reference circle of radius $2\rho_\infty$, into a transformed reference spectrum $S_i$ inscribed in a circle of variable radius $2\rho_i$, by varying a ratio $H_i$ of said homothety which is equal to $2\rho_i/2\rho_\infty$;

/9/ storing the homothety ratio $H_i$, when all the peaks of the transformed reference spectrum $S_i$ are superimposed with peaks of the spectrum of the captured image $S_{tot}$, the transformed reference spectrum $S_i$ then coinciding with one of the components of the spectrum of the captured image $S_{tot}$; and /10/ calculating the distance to one of the objects in the field of view, using the formula $d_i=d/(H_i-1)$; then repeating the sequence of steps /8/ to /10/ until it is no longer possible to perform step /9/ with a new value for the homothety ratio $H_i$, each distance obtained during one of the executions of step /10/ corresponding to one of the objects contained in the field of view.

2. The method according to claim 1, wherein the iterations of the sequence of steps /8/ to /10/ are counted, and the number n of objects contained in the field of view is determined as being equal to the number of said iterations.

3. The method according to claim 1, wherein the component is a periodic continuously self-imaging grating.

4. A device for range imaging, comprising:
- a planar optical component having a transmittance t, said transmittance varying as a function of two coordinates (x, y) in a plane of the component, and having a two-dimensional Fourier transform T consisting of peaks located on a base circle of radius $\rho_\infty$;
- an image sensor, arranged parallel to and at a distance $d_f$ from the component, on the side of said component that is opposite the field of view, with an optical axis Z perpendicular to the component and to the sensor;
- a storage unit adapted for storing an image captured by the sensor, and for storing a reference spectrum $S_{ref}$ corresponding to peaks of a Fourier transform of a reference image as produced by a point light source located at infinite distance away on axis Z, said reference spectrum $S_{ref}$ consisting of reference spatial frequencies and inscribed in a reference circle of radius $2\rho_\infty$, equal to twice the radius of the base circle; and
- a computation unit adapted for executing steps /7/ to /10/ of a method according to claim 1, repeating the sequence of steps /8/ to /10/ as long as a new value for the homothety ratio $H_i$ is obtained in step /9/;

wherein the component is adapted so that the Fourier transform T of the transmittance t of said component consists of a finite number N of peaks distributed on the base circle.

5. The device according to claim 4, wherein the component is a periodic continuously self-imaging grating.

6. The device according to claim 5, wherein the component is a phase grating.

* * * * *